Jan. 15, 1952     D. C. LUMB ET AL     2,582,784
TORQUE DYNAMOMETER
Filed July 15, 1950
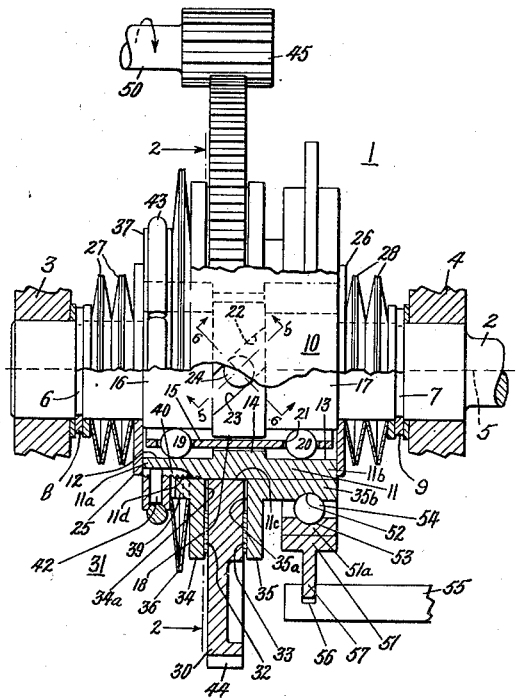
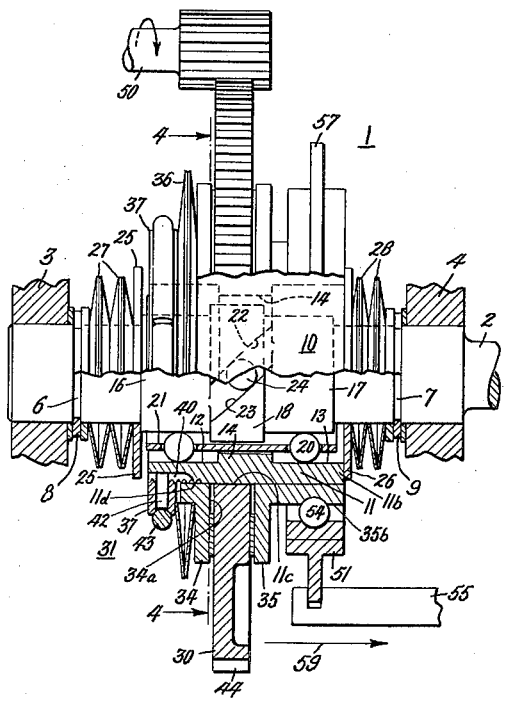
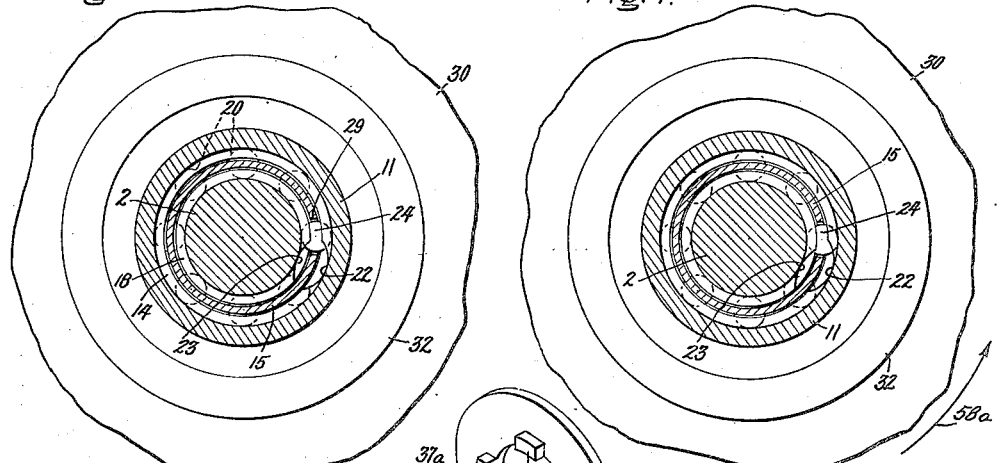
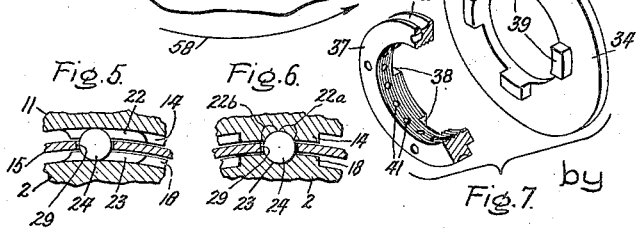
Inventors:
David C. Lumb;
Boris Pundick,
by
Their Attorney.

Patented Jan. 15, 1952

2,582,784

UNITED STATES PATENT OFFICE 2,582,784

TORQUE DYNAMOMETER

David C. Lumb and Boris Pundick, Schenectady, N. Y., assignors to General Electric Company, a corporation of New York Application July 15, 1950, Serial No. 174,086

3 Claims. (Cl. 73—136)

This invention relates to torque dynamometers and has for an object the provision of a simple reliable dynamic torque measuring drive device.

A further object of our invention is to provide a simple reliable dynamic torque measuring and limiting drive device.

Devices of this type have many practical applications and in general are useful for measuring and controlling the torque being transmitted through rotating parts.

In general, our invention consists of a torque dynamometer comprising a ball bearing drive connection between a drive member and a driven member to provide axial displacement of one member with respect to the other responsive to relative rotation of the members about a common axis, and clutch means for limiting the torque applied to the driven member.

For a complete understanding of our invention, reference should be had to the following specification and the accompanying drawing in which Fig. 1 is a side view, partly in cross-section, of a torque dynamometer illustrative of our invention; Fig. 2 is a cross-section view taken on line 2—2 of Fig. 1; Fig. 3 is a side view, partly in cross-section showing the dynamometer of Fig. 1 under load condition; Fig. 4 is a cross-section view taken on line 4—4 of Fig. 3; Fig. 5 is a limited cross-sectional view taken on lines 5—5 of Fig. 1; Fig. 6 is a limited cross-sectional view taken on line 6—6 of Fig. 1; and Fig. 7 is an exploded view of an adjusting nut and washer shown in cross-section in Fig. 1.

Referring to the drawing in detail, in Fig. 1 thereof is shown a dynamometer 1 illustrative of our invention. The dynamometer 1 comprises a driven shaft 2 rotatably journaled in a pair of fixed bearing supports 3 and 4 for rotation about an axis of rotation through the center of the shaft 2 and indicated by the dotted line 5.

To prevent axial displacement of the shaft 2, annular grooves 6 and 7 are formed in the outer periphery thereof adjacent the fixed bearing supports 3 and 4 and a pair of ring members 8—9 are fitted into the respectitve grooves 6—7 and abutting the respective bearing supports 3—4.

To transmit a controlled rotational torque to the shaft 2 from a drive member, to be described later, a ball bearing drive connection 10 is provided. The drive connection 10 comprises an annular member 11 positioned on the shaft 2 and having interior cylindrical surfaces comprising a pair of spaced raceway surfaces 12—13 concentric with the axis of rotation 5 of the shaft 2, and an annular projecting portion 14 positioned between the spaced raceway surfaces 12—13.

Drive connection 10 also comprises a cylindrically shaped retainer member 15 positioned between the shaft 2 and the annular member 11.

To provide for rotational support of the annular member 11 on the shaft 2, additional cylindrical spaced raceway surfaces 16—17 are formed adjacent an annular projecting portion 18 on the periphery of the shaft 2 and in alignment with the respective spaced raceway surfaces 12—13, and a first and second plurality of spaced bearing balls 19 and 20 are positioned to engage respectively the aligned raceway surfaces 12 and 16 and 13 and 17. The retainer member 15 is provided with a plurality of spaced apertures 21 therein to accommodate the bearing balls 19—20 and maintain the spaced relation thereof.

It will be noted that since the cylindrical raceway surfaces 12—13 and 16—17 are concentric with the axis of rotation 5 of the driven shaft 2, the annular member 11 in addition to being rotatably supported on the shaft 2, is also free to be slidably displaced parallel to the axis of rotation 5.

To provide for rotation of the driven shaft 2 in response to rotation of the annular member 11, and further to provide for slidable displacement of the annular member 11 with respect to the shaft 2 and parallel to the axis of rotation 5, a pair of mating drive grooves 22—23 are formed respectively in the projecting portion 14 of the annular member 11 and the projecting portion 18 of the driven shaft 2 at an angle to the axis of rotation 5 of the driven shaft 2, as shown in Figs. 1, 2, 5 and 6, and a drive ball 24 is positioned to engage the mating grooves 22—23.

The grooves 22—23 are formed at an angle to the axis of rotation 5 to provide, under load conditions on the driven shaft 2, slidable displacement of the annular member 11 along the shaft 2 and in a direction dependent upon the direction of rotation of the annular member 11. That is, under conditions of zero load on the shaft 2 rotation of the annular member 11 causes rotation of the shaft 2 at the same speed as the annular member 11 and no rotational or axial displacement results between the shaft 2 and the annular member 11. However, when load is applied to the shaft 2 and the annular member 11 is rotated, both rotational and axial forces in relative magnitude depending upon the degree of angle between the grooves 22—23 and the axis of rotation 5, and dependent upon the load on the shaft 2 are developed. The direction of the axial force on the member 11 is dependent upon the direction of rotation thereof. For example, counterclockwise rotation of the annular member 11, as indicated by an arrow 58 in Fig. 2, under load conditions results in relative rotation of the annular member 11 with respect to the driven shaft 2 in the same direction, as indicated in Fig. 4 by an arrow 58a, and causes pressure of the drive ball 24 on a lower portion 22a of the groove 22, best seen in Fig. 6, to slidably displace the annular member 11 to the right, as indicated by an arrow 59 in Fig. 3. Conversely, clockwise rotation of the annular member 11, under load conditions on the driven shaft 2, results in pressure of the drive ball 24 on a portion 22b of the groove 22 of the annular member 11 and axial displacement of the annular member 11 to the left, as viewed in Fig. 1.

To utilize the axial displacement of the annular member 11 to measure torque on the driven shaft 2, in terms of axial displacement at the annular member 11 from a zero position indicated in Fig. 1, a pair of washers 25—26 are positioned on the shaft 2 abutting respectively opposite ends 11a and 11b of the annular member 11 and spring means, as for example pairs of Belleville springs 27—28, are positioned on the driven shaft 2 to abut the respective axially fixed ring members 8—9 and the respective washers 25—26 to provide a biasing force tending to maintain the annular member 11 in the zero position indicated in Fig. 1. Thus, as torque is increased on the driven shaft 2, one or the other of the pairs of Belleville springs 27—28 are compressed by slidable displacement of the annular member 11 until a balancing force proportional to the torque on the driven shaft 2 is obtained.

For example, comparing Figs. 1 and 2 with Figs. 3 and 4 of the drawing, it will be noted that, in Figs. 1 and 2 representing a condition of zero load on the driven shaft 2 and counterclockwise rotation of the annular member 11, as indicated by the arrow 58 in Fig. 2, the annular member 11 is centered with respect to the washers 25 and 26 and each of the pairs of Belleville springs 27—28 are in normal expanded condition. Next, considering Figs. 3 and 4 illustrating a condition of load on the driven shaft 2, it will be noted that the arrow 58 of Fig. 2 has assumed in Fig. 4 a position indicated by the reference number 58a. That is, by placing load upon the driven shaft 2 the annular member 11 has been caused to rotate in a counterclockwise direction with respect to the driven shaft 2. The result of the relative rotation of the annular member 11 and the driven shaft 2, as seen in Fig. 3, is a displacement of the annular member 11 along the driven shaft 2 parallel to the axis of rotation 5 thereof and in a right hand direction as viewed in Fig. 3. In moving to the right the annular member 11 compresses the pairs of Belleville springs 28 until a balance of forces upon the annular member 11 dependent upon the load upon the driven shaft 2 and the biasing force of the compressed springs 28 is reached.

As load is increased upon the driven shaft 2 a greater force is required from the annular member 11 to rotate the driven shaft 2 and therefore the axial component of the rotational force required is increased and the annular member 11 is moved a greater distance to the right compressing the Belleville springs 28 further until a balance of forces upon the annular member 11 is again reached. Slidable displacement of the annular member 11 may therefore be used to measure the torque upon the driven shaft 2.

The retainer member 15 is apertured as at 29 to accommodate the drive ball 24 and return the ball 24 to a centered position in the grooves 22—23 when the annular member 11 is in the zero position indicated in Fig. 1.

To rotate the annular member 11 about the axis of rotation 5 and to limit the maximum torque applied to the driven shaft 2, a drive wheel 30 rotatably journaled on a cylindrical periphery 11c of the annular member 11 and an adjustable clutch means 31 connecting the drive member 30 to the annular member 11 is provided.

The clutch means 31 comprises a pair of annular clutch surfaces members 32—33, a pair of flanged annular member 34—35, a Belleville spring means 36 and an adjusting nut 37. The clutch surface member 32—33 are sintered or otherwise fixed to opposite sides of the drive wheel 30 to rotate therewith. The flanged annular member 35 is pressed or otherwise fixed to the outer periphery 11c of the annular member 11 to rotate therewith, and a flat annular surface 35a is formed on the flange member 35 to engage the clutch surface member 33. The flange member 34 is slidably positioned on the periphery 11c of the annular member 11 and an annular flat surface 34a is formed thereon to engage the clutch surface member 32.

To adjust the pressure of the annular members 34 and 35 on the clutch surface members 32 and 33 of the drive wheel 30 and thereby limit the maximum torque transmitted to the driven shaft 2, a portion 11d of the exterior periphery 11c of the annular member 11 adjacent the end 11a thereof is threaded as shown in Figs. 1 and 3, the Belleville spring means 36 is positioned in engagement with the annular member 34 and the adjusting nut 37 is threaded on the threaded portion 11d of the annular member 11 to engage and compress the Belleville spring means 36.

The adjusting nut 37 is provided with a plurality of spaced recesses 38, best seen in Fig. 7, to receive a plurality of spaced projections 39 formed on the annular member 34 to lock the member 34 to the adjusting nut 37.

To fix the adjusting nut 37 in a desired adjusted position on the member 11, thereby to fix the annular member 34 to the annular member 11 to rotate in unison therewith, and to maintain a desired pressure on the spring means 36, a plurality of spaced grooves 40, as shown in Figs. 1 and 3, are formed in the threaded portion 11d of the annular member 11 parallel to the axis of rotation 5, a plurality of spaced apertures 41 are formed in the nut 37, as shown in Fig. 7, and one or more pins, as for example pin 42, shown in Figs. 1 and 3, are inserted in the apertures 41 of the nut 37 and in alignment with grooves 40 of the annular member 11 after adjustment of the nut 37.

To maintain the pins 42 in position, an annular groove 37a is formed in the periphery of the nut 37 and a lock ring 43, shown in Figs. 1 and 3, is positioned in the groove 37a of the nut 37. Thus, by means of the adjusting nut 37 and the spring means 36, a desired pressure is maintained on the slidable annular member 34 to maintain a desired clutch pressure on the drive wheel 30 and thereby limit the maximum torque applied to the driven shaft 2.

The drive wheel 30 may be rotated by any suitable means. For example, as shown in Figs. 1 and 3, teeth 44 are formed in the outer periphery of the drive wheel 30 and arranged to engage an elongated spur gear 45 formed on the end of a drive shaft 50.

To transmit the axial linear motion of the rotating annular member 11 to a measuring device (not shown) to measure the torque being transmitted to the driven shaft 2 in terms of the axial displacement of the annular member 11, a ball bearing ring member 51 is rotatably mounted, as shown in Figs. 1 and 3, on a peripheral portion 35b of the annular member 35 by means of aligned mating concave annular grooves 52—53 formed respectively in adjacent surfaces 35b and 51a of the members 35 and 51, and a plurality of bearing balls 54 engaging the grooves 52—53.

Since the annular member 35 is fixed to the annular member 11 and since the ball bearing ring member 51 is fixed insofar as axial movement with respect to the member 35 is concerned by the concave shape of the grooves 52—53 and the spherical shape of the bearing balls 54, axial displacement of the member 11 is transmitted to the ring member 51. A rod 55 having a recessed portion 56 to accommodate an annular projecting portion 57 of the ring member 51 is provided to transmit linear axial displacement of the ring member 51 to a measuring device (not shown). The torque on the driven shaft 2 is therefore measured in terms of the axial displacement of the annular member 11.

While we have shown and described a particular embodiment of our invention those skilled in the art will understand that various changes and modifications may be made therein without departing from our invention in its broader aspects and we, therefore, aim in the appended claims to cover all such changes and modifications as fall within the true spirit and scope of our invention.

What we claim as new and desire to secure by Letters Patent of the United States is:

1. A torque measuring drive unit comprising a driven member having an axis of rotation therethrough, a ball bearing drive connection comprising an annular member positioned on said driven member, spaced cylindrical raceways formed in the exterior of said driven member and the interior of said annular member and concentric with said axis of rotation, ball bearing means engaging said raceways to rotatably support said annular member on said driven member and to provide for slidable movement of said annular member parallel to said axis of rotation, mating aligned grooves formed in the exterior of said driven member and the interior of said annular member at an angle to said axis of rotation, means comprising a bearing ball engaging said mating grooves to transmit a rotational force to said driven member in response to rotation of said annular member and to provide a sliding displacement of said anular member parallel to said axis of rotation from a zero position in response to relative rotation of said annular member and said driven member, means for mechanically connecting said annular member to a drive member to rotate said driven member, and means biasing said annular member to zero position to measure the torque on said driven shaft as a function of said displacement of said annular member.

2. A torque dynamometer comprising a driven member having an axis of rotation therethrough, a ball bearing drive connection comprising an annular member positioned on said driven member, spaced raceways formed in the exterior of said driven member and the interior of said annular member and concentric with said axis of rotation, ball bearing means engaging said raceways to rotatably support said annular member on said driven member and to provide for slidable movement of said annular member parallel to said axis of rotation, mating aligned grooves formed in the exterior of said driven member and the interior of said annular member at an angle to said axis of rotation, means comprising a bearing ball engaging said mating grooves and said ball bearing means to transmit a rotational force to said driven member in response to rotation of said annular member and to provide a sliding displacement of said annular member parallel to said axis of rotation in response to relative rotation of said annular member and driven member, means for mechanically connecting said annular member to a drive member to rotate said driven member, and spring means spaced on said driven member along said axis of rotation to control the slidable displacement of said annular member from a zero position to measure the torque on said driven member as a function of said displacement of said annular member.

3. A torque dynamometer comprising a driven member having an axis of rotation therethrough, a ball bearing drive connection comprising an annular member positioned on said driven member, spaced raceways formed in the exterior of said driven member and the interior of said annular member and concentric with said axis of rotation, a plurality of spaced bearing balls engaging said raceways to provide for rotation of said annular member on said driven member and for slidable displacement of said annular member parallel to said axis of rotation, mating aligned grooves formed respectively in the exterior of said driven member and the interior of said annular member at an angle to said axis of rotation, a drive ball engaging said mating grooves to transmit a rotational force to said driven member in response to rotation of said annular member and to provide a sliding displacement of said annular member parallel to said axis of rotation in response to limited rotation thereof about said driven member, a retainer member positioned between said driven member and said annular member and having a plurality of spaced apertures to accommodate said plurality of bearing balls to maintain said spaced relation therebetween and an additional spaced aperture therein to accommodate said drive ball and control the position thereof in said grooves, means for rotating said annular member to rotate said driven member, and means biasing said annular member to a zero position to measure the torque on said driven member as a function of the slidable displacement of said annular member from zero position.

DAVID C. LUMB.
BORIS PUNDICK.

REFERENCES CITED

The following references are of record in the file of this patent:

UNITED STATES PATENTS

| Number | Name | Date |
|---|---|---|
| 2,353,814 | De Pew | July 18, 1944 |

FOREIGN PATENTS

| Number | Country | Date |
|---|---|---|
| 376,054 | France | May 30, 1907 |
| 5,804 | Great Britain | 1909 |
| 335,469 | Italy | Feb. 5, 1936 |